US010196918B2

(12) United States Patent
McCaffrey

(10) Patent No.: US 10,196,918 B2
(45) Date of Patent: Feb. 5, 2019

(54) BLADE OUTER AIR SEAL MADE OF CERAMIC MATRIX COMPOSITE

(71) Applicant: United Technologies Corporation, Farmington, CT (US)

(72) Inventor: Michael G. McCaffrey, Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 409 days.

(21) Appl. No.: 15/176,035

(22) Filed: Jun. 7, 2016

(65) Prior Publication Data
US 2017/0350268 A1 Dec. 7, 2017

(51) Int. Cl.
F01D 11/08 (2006.01)
F01D 25/24 (2006.01)
F01D 25/28 (2006.01)

(52) U.S. Cl.
CPC .............. F01D 11/08 (2013.01); F01D 25/24 (2013.01); F01D 25/28 (2013.01);
(Continued)

(58) Field of Classification Search
CPC .......... F01D 11/08; F01D 25/24; F01D 25/28; F05D 2220/32; F05D 2240/11; F05D 2260/30; F05D 2300/6033; Y02T 50/672
See application file for complete search history.

(56) References Cited

U.S. PATENT DOCUMENTS 4,728,257 A * 3/1988 Handschuh ............. F01D 11/24
415/136
6,406,256 B1 * 6/2002 Marx ...................... F01D 11/16
415/138

(Continued)

FOREIGN PATENT DOCUMENTS

EP 2784272 A2 10/2014
WO 2015023576 A1 2/2015
(Continued)

OTHER PUBLICATIONS

European Search Report dated Oct. 27, 2017 for EP Patent Application No. 17174691.0.

Primary Examiner — Igor Kershteyn
(74) Attorney, Agent, or Firm — Bachman & LaPointe, P.C.

(57) ABSTRACT

A blade outer air seal (BOAS) segment has a transversely concave inner diameter (ID) surface along a main body portion and extending from a first circumferential end to a second circumferential end. A first mounting ear extends outward from the main body portion and cooperates with a first end portion of the main body portion to define a first circumferentially outwardly open mounting recess. A second mounting ear extends outward from the main body portion and cooperates with a second end portion of the main body portion to define a second circumferentially outwardly open mounting recess. An outwardly open well is between the first mounting ear and the second mounting ear; a plurality of layers are formed of a ceramic matrix composite (CMC) material and include: a first plurality extending along the first circumferentially outwardly open mounting recess; a second plurality extending along the second circumferentially outwardly open mounting recess; and a third plurality extending along from the first mounting ear to the second mounting ear. One or more first wedges are between layers along the first mounting ear to circumferentially flare the layers along the first mounting ear. One or more second wedges are between layers along the second mounting ear to circumferentially flare the layers along the second mounting ear.

16 Claims, 8 Drawing Sheets

(52) U.S. Cl.
CPC ...... *F05D 2220/32* (2013.01); *F05D 2240/11* (2013.01); *F05D 2260/30* (2013.01); *F05D 2300/6033* (2013.01); *Y02T 50/672* (2013.01)

(56) References Cited

U.S. PATENT DOCUMENTS

| | | | | |
|---|---|---|---|---|
| 6,702,550 B2 * | 3/2004 | Darkins, Jr. | ............ | F01D 9/04 |
| | | | | 415/116 |
| 7,052,235 B2 * | 5/2006 | Alford | ............ | F01D 9/04 |
| | | | | 415/173.1 |
| 8,534,995 B2 * | 9/2013 | McCaffrey | ............ | F01D 11/08 |
| | | | | 415/173.1 |
| 8,568,091 B2 * | 10/2013 | McCaffrey | ............ | F01D 11/125 |
| | | | | 415/173.3 |
| 8,790,067 B2 * | 7/2014 | McCaffrey | ............ | F01D 11/18 |
| | | | | 415/1 |
| 9,200,530 B2 * | 12/2015 | McCaffrey | ............ | F01D 11/16 |
| 9,447,696 B2 * | 9/2016 | McCaffrey | ............ | F01D 11/18 |
| 2011/0219775 A1 | 9/2011 | Jarmon et al. | | |
| 2014/0271145 A1 | 9/2014 | Thomas et al. | | |
| 2016/0215645 A1 * | 7/2016 | McCaffrey | ............ | F01D 25/246 |

FOREIGN PATENT DOCUMENTS

| | | |
|---|---|---|
| WO | 2015/031764 A1 | 3/2015 |
| WO | 2015038341 A1 | 3/2015 |

* cited by examiner

BLADE OUTER AIR SEAL MADE OF CERAMIC MATRIX COMPOSITE

BACKGROUND

Gas turbine engines typically include a compressor section, a combustor section, and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other loads.

The compressor and turbine sections of a gas turbine engine include alternating rows of rotating blades and stationary vanes. The turbine blades rotate and extract energy from the hot combustion gases that are communicated through the gas turbine engine. The turbine vanes direct the hot combustion gases at a preferred angle of entry into a downstream row of blades. An engine case of an engine static structure may include one or more blade outer air seals (BOAS), which are typically formed of metal, that establish an outer radial flow path boundary for channeling the hot combustion gases.

International Application PCT/US2014/053424, filed Aug. 29, 2014, and published as WO2015/031764A1 (the '764 publication) discloses a ceramic matrix composite blade outer air seal segment. The disclosure of the '764 publication is incorporated by reference in its entirety herein as if set forth at length.

United States Patent Application Publication 20110219775 A1 (the '775 publication), of Jarmon, et al., published Sep. 15, 2011, discloses ceramic matrix composite materials with a sprayed hard coating. The disclosure of the '775 publication is incorporated by reference in its entirety herein as if set forth at length.

SUMMARY

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

One aspect of the disclosure involves a blade outer air seal (BOAS) segment. A transversely concave inner diameter (ID) surface is along a main body portion and extends from a first circumferential end to a second circumferential end. A first mounting ear extends outward from the main body portion. The first mounting ear and a first end portion of the main body portion to define a first circumferentially outwardly open mounting recess. A second mounting ear extends outward from the main body portion. The second mounting ear and a second end portion of the main body portion to define a second circumferentially outwardly open mounting recess. An outwardly open well is between the first mounting ear and the second mounting ear. A plurality of layers are formed of a ceramic matrix composite (CMC) material and includes a first plurality extending along the first circumferentially outwardly open mounting recess; a second plurality extending along the second circumferentially outwardly open mounting recess; and a third plurality extending along from the first mounting ear to the second mounting ear. One or more first wedges are between layers of said plurality of layers along the first mounting ear to circumferentially flare the layers along the first mounting ear. One or more second wedges are between layers of said plurality of layers along the second mounting ear to circumferentially flare the layers along the second mounting ear.

A further embodiment may additionally and/or alternatively include, the plurality of layers further including: one or more fourth layers between the first plurality of layers and the inner diameter (ID) surface; and one or more fifth layers between the second plurality of layers and the inner diameter (ID) surface.

A further embodiment may additionally and/or alternatively include, the plurality of layers further including: one or more sixth layers between: on the one hand, the one or more fourth layers, the third plurality of layers, and the one or more fifth layers; and on the other hand, the inner diameter (ID) surface.

A further embodiment may additionally and/or alternatively include, a base structure comprising the first, second, and third pluralities of layers and the plurality of layers further comprising an overwrap layer over the base structure.

A further embodiment may additionally and/or alternatively include, the overwrap layer overwrapping forward and aft ends of the base structure.

A further embodiment may additionally and/or alternatively include, the first and second pluralities of layers being curved in substantially a C-shape to respectively provide the first and second mounting recesses.

A further embodiment may additionally and/or alternatively include, the one or more first wedges and the one or more second wedges comprising CMC or monolithic ceramic.

A further embodiment may additionally and/or alternatively include, the one or more first wedges and the one or more second wedges having a peak thickness of at least 0.15 mm.

A further embodiment may additionally and/or alternatively include, the one or more first wedges and the one or more second wedges respectively fanning each of the first mounting ear and the second mounting ear by at least 15.0°.

A further embodiment may additionally and/or alternatively include, a first load-distributing member along the first mounting recess and a second load-distributing member along the second mounting recess.

A further embodiment may additionally and/or alternatively include, the first load-distributing member and the second load-distributing member being coatings.

A further embodiment may additionally and/or alternatively include, the first load-distributing member and the second load-distributing member being silicon-based.

A further embodiment may additionally and/or alternatively include, the first load-distributing member and the second load-distributing member having peak thickness of at least 0.05 mm.

Another aspect of the disclosure involves a gas turbine engine comprising: an engine case: a circumferential array of blade outer air seal (BOAS) segments; and a plurality of retention blocks attached to the engine case and each comprising a first portion received in the first recess of a first adjacent said BOAS segment and a second portion received in the second recess of a second adjacent said BOAS segment to support the BOAS segments relative to the engine case.

A further embodiment may additionally and/or alternatively include, the retention block first portion and the retention block second portion respectively contacting coatings on the respective associated BOAS segments.

A further embodiment may additionally and/or alternatively include, a plurality of wedge seals respectively between the plurality of retention blocks and their associated BOAS segments.

BRIEF DESCRIPTION OF THE DRAWINGS

The drawings can be briefly described as follows.

DETAILED DESCRIPTION

Figure 1:
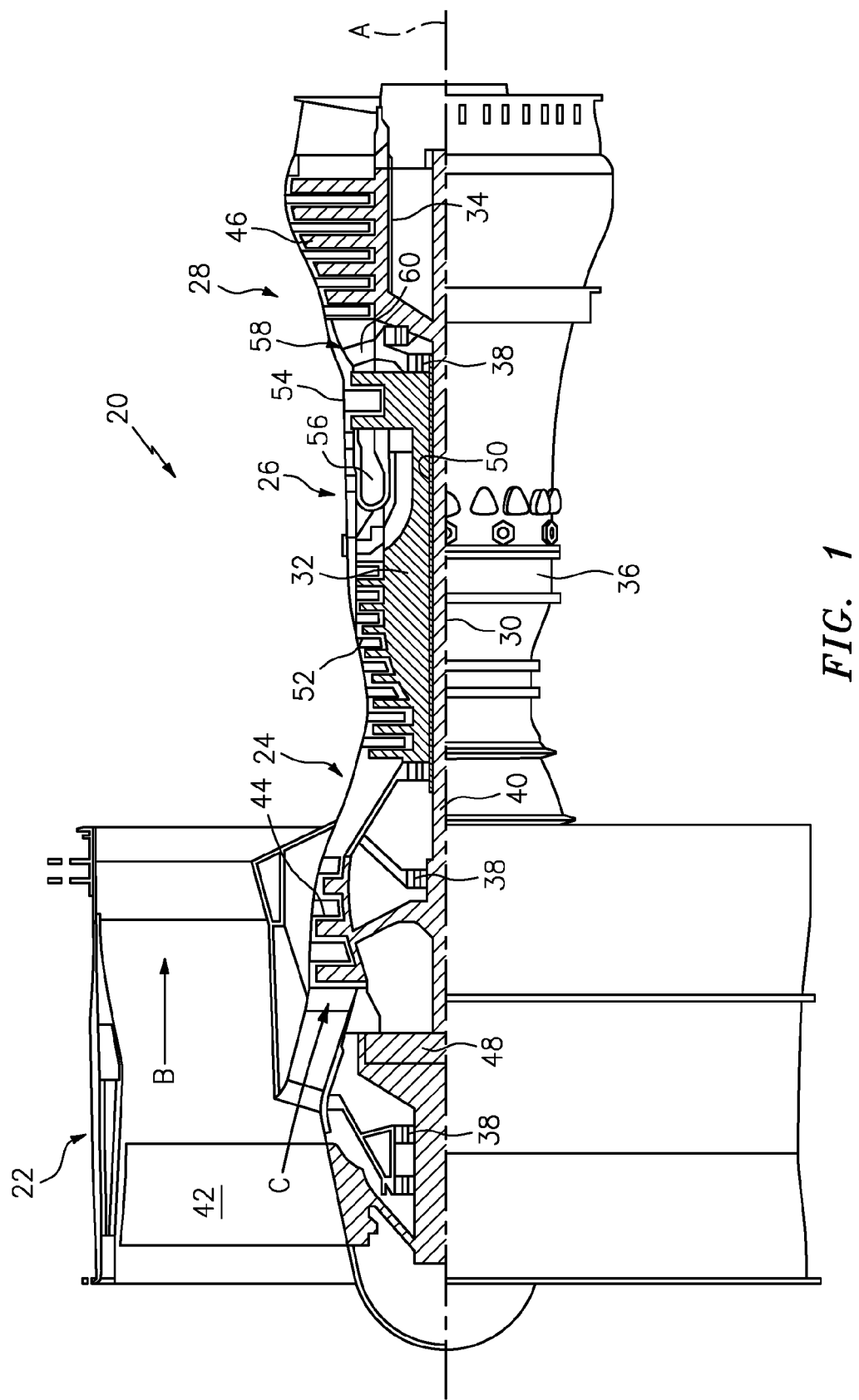
FIG. 1 is a schematic, cross-sectional view of a gas turbine engine.

FIG. 1 schematically and non-limitingly illustrates a gas turbine engine 20 that includes a fan section 22, a compressor section 24, a combustor section 26, and a turbine section 28. The exemplary illustrated engine is a two-spool engine as discussed below. Alternative engines might include an augmenter section (not shown) among other systems or features. The fan section 22 drives air along a bypass flow path B while the fan section and compressor section 24 drive a core airflow in along a core flow path C where air is compressed and communicated to the combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section. The concepts disclosed herein can further be applied outside of gas turbine engines.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path C and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow due to the high bypass ratio. The fan section 22 of the engine 20 is designed for a particular flight condition— typically cruise at about 0.8 Mach and about 35,000 feet (10.7 km). The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed," as disclosed herein according to one non-limiting embodiment, is less than about 1150 ft/second (351 m/s).

Figure 2:
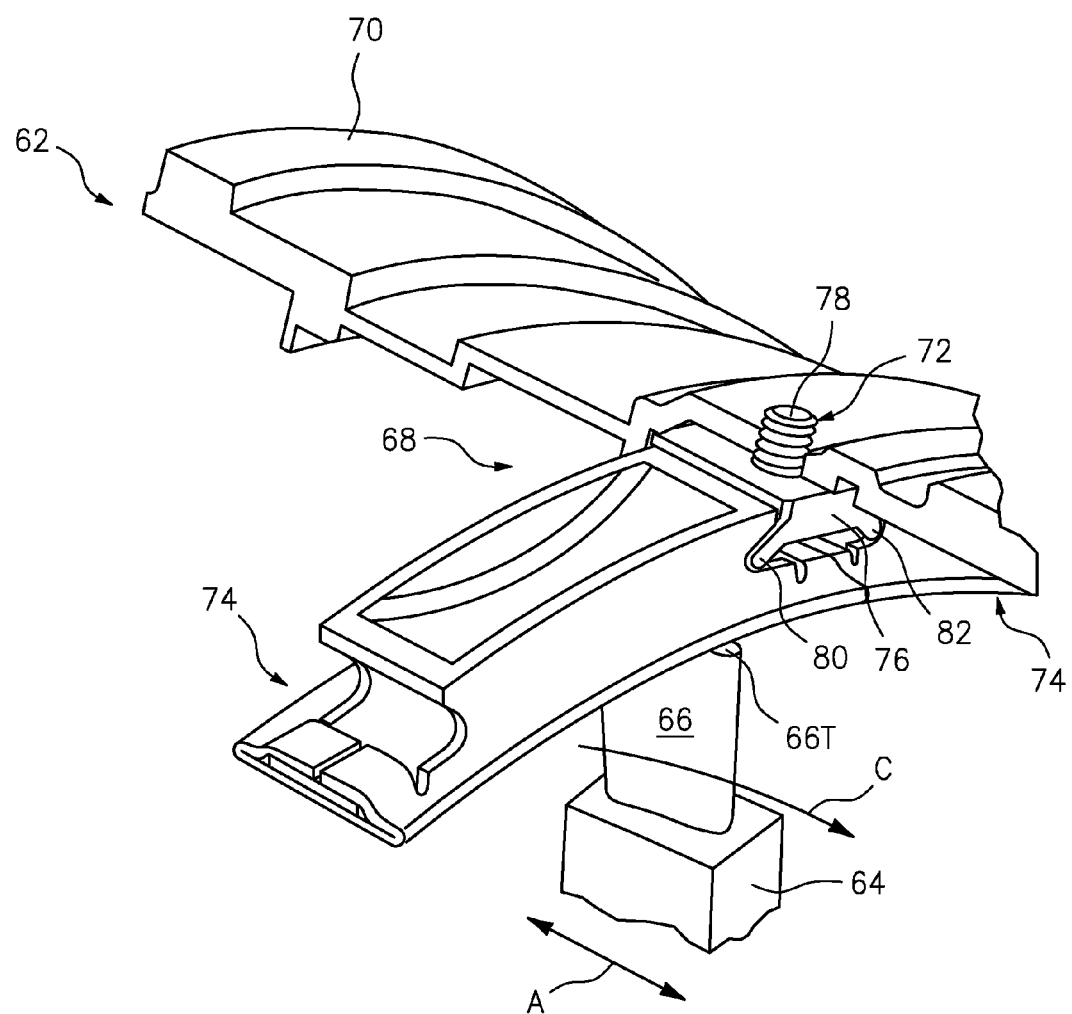
FIG. 2 is a partial view of the engine of FIG. 1.

FIG. 2 is a perspective view of a portion 62 of the gas turbine engine 20 of FIG. 1. In this embodiment, the portion 62 is a portion of the high pressure turbine 54. It should be understood, however, that other portions of the gas turbine engine 20 may benefit from the teachings of this disclosure, including but not limited to the fan section 22, the compressor section 24, and the low pressure turbine 46.

In this embodiment, a rotor disk 64 (only one shown, although multiple disks could be axially disposed within the portion 62) is configured to rotate about the engine central longitudinal axis A. The portion 62 includes an array of rotating blades 66 (only one shown), which are mounted to the rotor disk 64, and arrays of static vane assemblies (not shown) on axial sides of the blades 66.

Each blade 66 includes a blade tip 66T at a radially outermost portion thereof. The rotor disk 64 is arranged such that the blade tips 66T are located adjacent a blade outer air seal (BOAS) assembly 68. The BOAS assembly 68 may find beneficial use in many industries including aerospace, industrial, electricity generation, naval propulsion, pumps for gas in oil transmission, aircraft propulsion, vehicle engines and stationary power plants.

The BOAS assembly 68 is disposed in an annulus radially between an engine case (such as an outer casing 70 of the engine 20) and the blade tips 66T. The BOAS assembly 68 includes a support structure 72 and a plurality of BOAS segments 74. The BOAS segments 74 may be arranged to form a segmented full ring hoop assembly that circumferentially surrounds the associated blades 66, which provides a sealing surface for the blade tips 66T to prevent leakage of the core airflow over to the blades 66. For ease of reference, the individual BOAS segments 74 may be referred to individually as a "BOAS segment" or simply a "BOAS."

Figure 3:
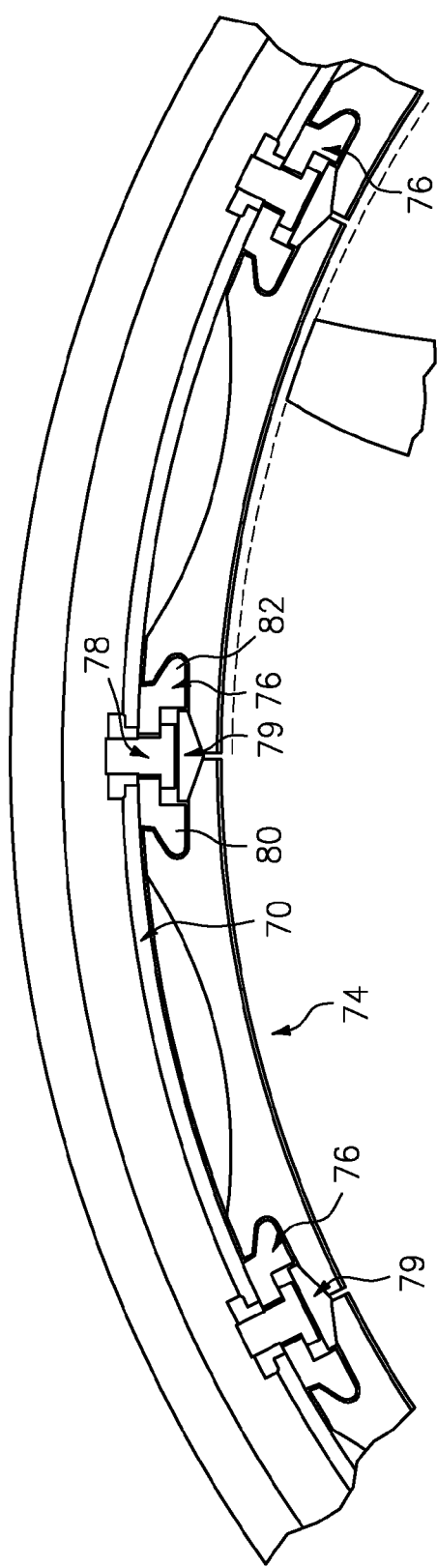
FIG. 3 is a partial longitudinal cutaway view of the engine.

In this example, the support structure 72 includes a retention block 76 fastened to the engine outer casing 70 by a fastener 78. The retention block 76 includes tapered arms 80, 82 on circumferentially opposed sides thereof. The tapered arms 80, 82 in this example are rounded, and are to be received within a corresponding curved end of a respective BOAS segment 74 (as will be explained below). FIG. 3 also shows a wedge seal 79 sealing the inter-segment gap and retained in a compartment in the inner diameter (ID) face of the retention block 76.

Figure 4:
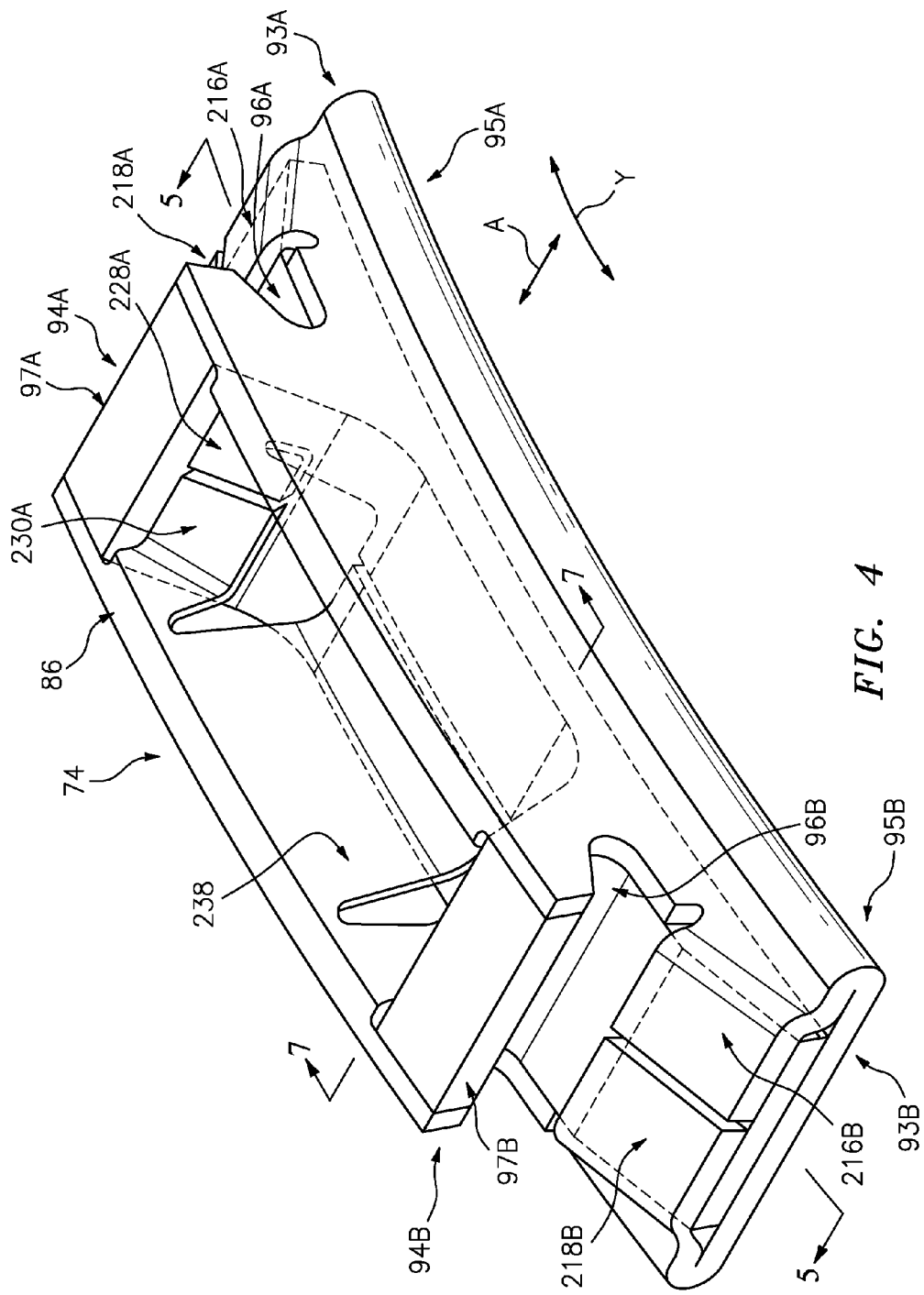
FIG. 4 is a perspective view of a blade outer airseal (BOAS) segment.
Figure 5:
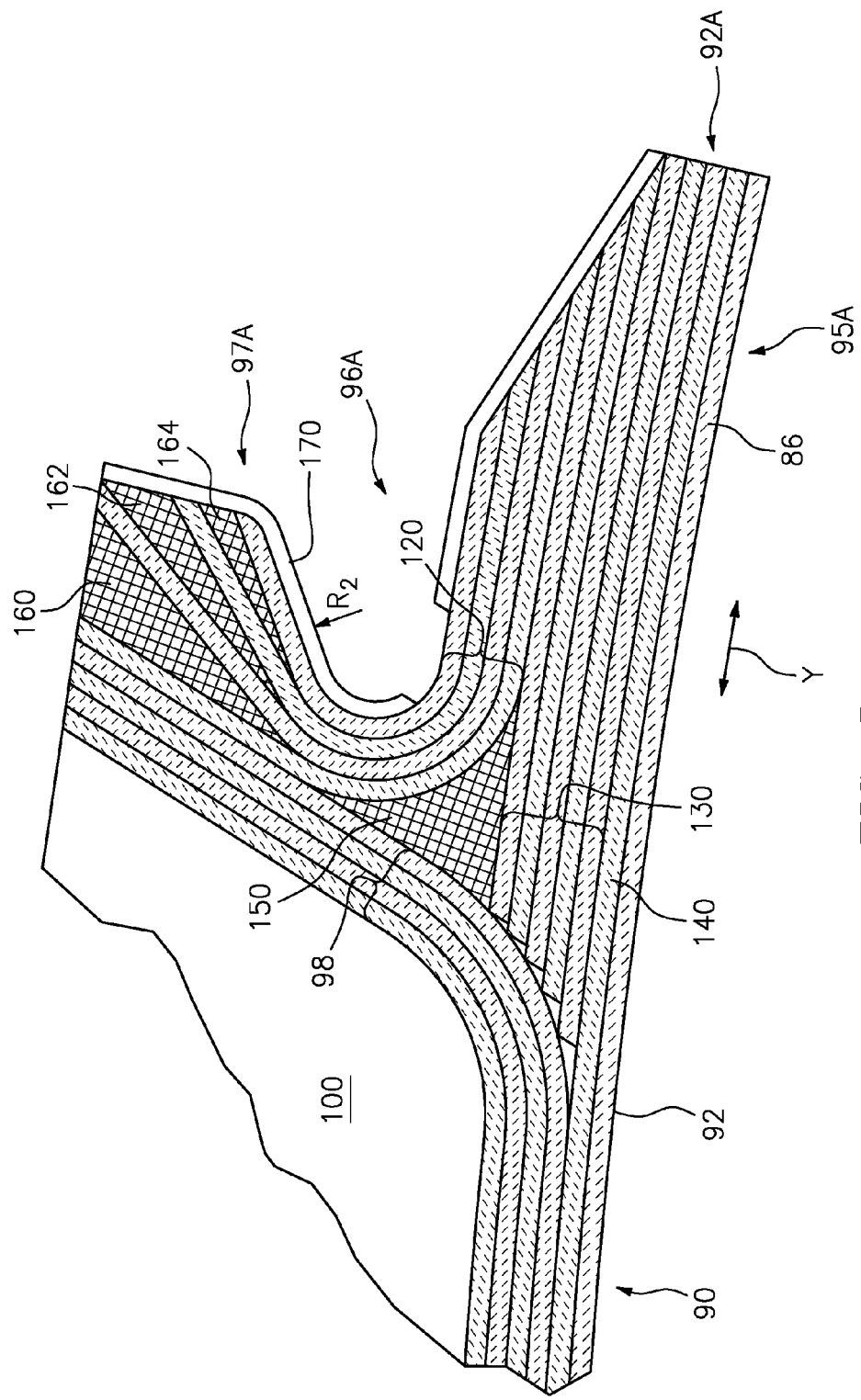
FIG. 5 is a partial transverse (engine frame of reference) sectional view of the BOAS segment taken along line 5-5 of FIG. 4.

FIG. 4 illustrates the detail of an example of a BOAS segment 74. In this example, the BOAS segment 74 is primarily made of a ceramic matrix composite (CMC) material. As with the '764 publication, the BOAS segment 74 may include some non-CMC materials, such as for the fillers or spacers, discussed below. CMC materials include a ceramic matrix and a plurality of fibers suspended in that ceramic matrix. The fibers can be a ceramic fibers, silicon carbide fibers, carbon fibers, or metallic fibers, as examples. As is discussed further below, additional fillers may be added beyond those of the '764 publication in order to reorient plies/layers of the CMC to better resist fracture. With reference to FIG. 5, the circumferential direction Y is normal to the engine central longitudinal axis A.

Figure 6:
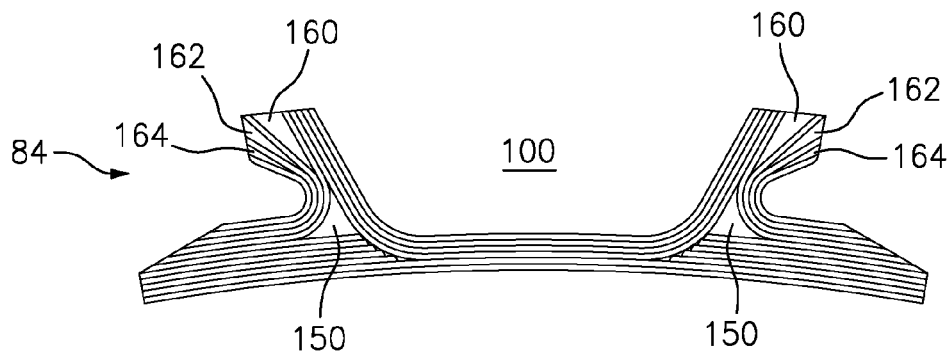
FIG. 6 is view of a base or core structure of the BOAS segment of FIG. 5.
Figure 7:
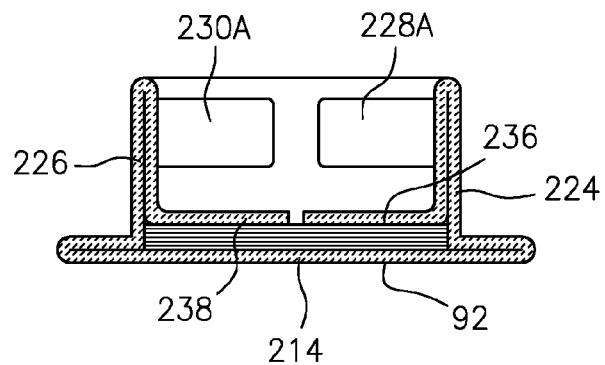
FIG. 7 is a longitudinal (engine frame of reference) sectional view of the BOAS segment taken along line 7-7 of FIG. 4
Figure 8:
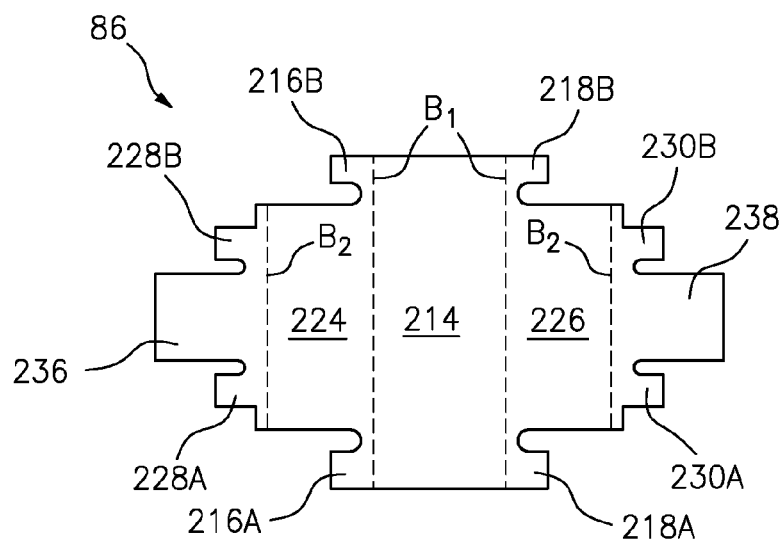
FIG. 8 is a plan view of an overwrap layer of the BOAS segment.

The exemplary BOAS segment 74 includes a base structure or core 84 (FIG. 6) and an overwrap layer 86 (FIGS. 5 and 8). The detail of the base structure 84 is perhaps best seen with reference to FIG. 5, which is a cross-sectional view taken along lines 5-5 in FIG. 4. For ease of reference, FIG. 6 does not include the overwrap layer 86.

The BOAS segment 74 has a main body portion 90 having an inner diameter (ID) surface 92 and extending between a first circumferential end 93A and a second circumferential end 93B (FIG. 4). The BOAS segment further comprises a pair of mounting ears 94A and 94B radially outward of the main body 90 and separated from adjacent main body end portions 95A, 95B by associated longitudinal channels (also referred to as recesses or slots) 96A, 96B circumferentially outwardly open. The mounting ears have respective circumferentially outboard ends 97A, 97B. Thus, the mounting ears and the respective adjacent main body end portions cooperate to define the respective recesses.

The base structure 84 comprises a number of groups of plies. One group 98 of plies may form a bridge extending centrally along the main body and then outward along the mounting ears to leave a central channel, well, or recess 100 radially outwardly open.

Another group 120 of plies extends along the mounting ear circumferentially outboard of adjacent portions of the plies 98 and along the main body portion 95A or 95B thus bending around an arc to form the associated recess 96A or 96B. Accordingly, respective groups 120 may be at opposite circumferential ends of the structure 84.

Similarly, groups 130 of plies may build thickness of the associated portion 95A or 95B terminating adjacent the bend of the group 98. In the exemplary embodiment, additionally, one or more plies 140 extend essentially full circumferential span radially inward of the groups 98 and 130 and thus generally parallel to the surface 92.

FIG. 5 further shows a filler or spacer 150 similar to that of the '764 publication filling a gap at the bend of the group 120.

FIG. 5 also shows several further modifications relative to the '764 publication. A first modification involves the use of wedges 160, 162, 164 to fan out the plies along the mounting ears. The exemplary wedges are positioned between plies of the group 120; however the wedges may also be within the group 98. The wedges may be used to orient the plies to maximally resist loads that would otherwise cause cracking. Wedge materials may be similar to those of the wedge/spacer 150. For example, the wedges may be made of a CMC. In one group of examples, these are initially formed as a mix of ceramic fibers and a ceramic-precursor resin material (e.g., molded). This molded material in a green state may be laid up with the plies or their precursors (fully or partially processed/cured CMC). In other examples, the wedges may be made of a monolithic ceramic or a fully processed CMC material.

Exemplary individual wedges have peak thickness of at least 0.15 mm, more specifically 0.15 mm to 5.0 mm, more specifically, 0.30 mm to 3.0 mm. The individual wedges may have an included angle of 2.0° to 15.0°, more specifically 4.0° to 12.0° Depending on the particular implementation, the wedges may fan the plies by a net angle of at least 15.0°, more specifically 15° to 70°, more specifically 20° to 55° or 35° to 50°. In a reengineering of a baseline BOAS segment this may be effective to reorient the side surface of the well 100 (formed by the group 98) by that same angle. Such reengineering may bring the side surface close to radial (e.g., within 20°, more specifically within 10°, or within 5°. Likely, it will be at least 2° off radial to allow radial extraction of the tool (e.g., functioning as a mandrel to form the well).

A second modification is the addition of a load distributing member 170 atop the outermost ply of the group 120 along the outboard surface of the recess 96A, 96B. The member 170 interfaces with the retention block and helps to distribute loads. The exemplary member 170 is formed in situ as a coating. An exemplary coating is silicon based such as silicon and/or silicon carbide. An exemplary application technique is plasma spray. An exemplary thickness is 0.05 mm to 0.50 mm, more specifically, 0.07 mm to 0.15 mm at least locally/peak, optionally feathering or tapering out. Exemplary coating properties may have the coating harder than the CMC to reduce pressure concentrations in the CMC. The coating may be sprayed to a greater thickness and then ground down.

Figure 3A:
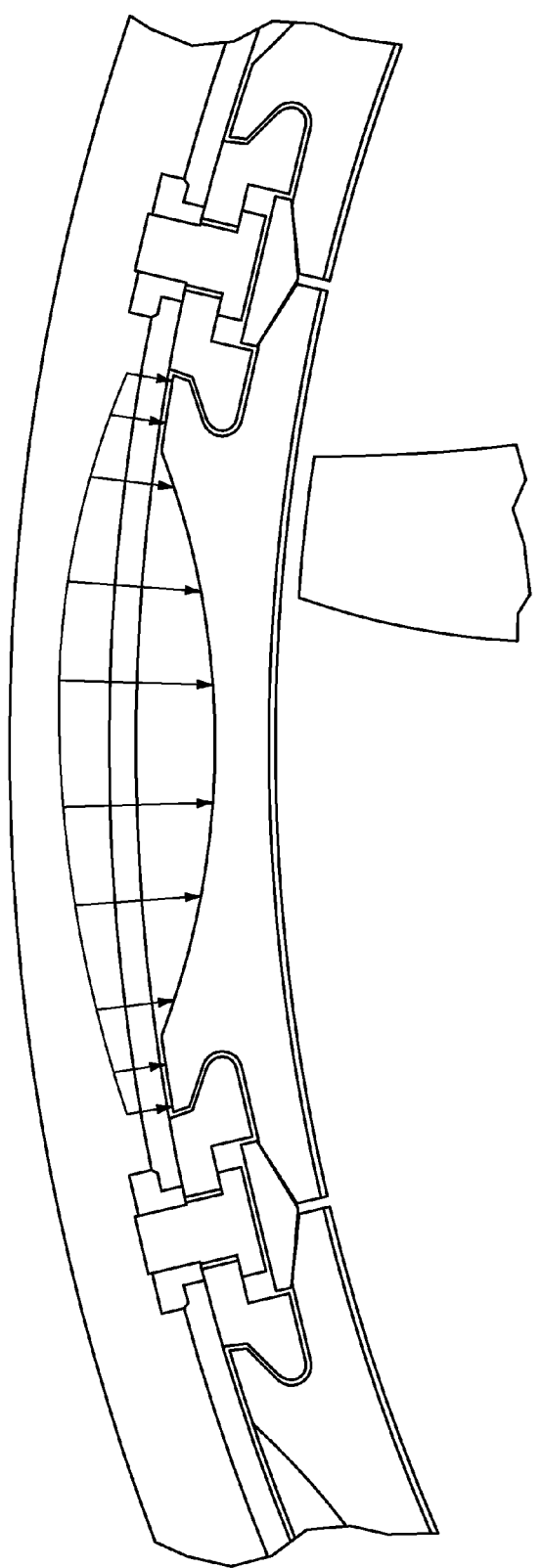
FIG. 3A is an enlarged view of the engine of FIG. 3.
Figure 9:
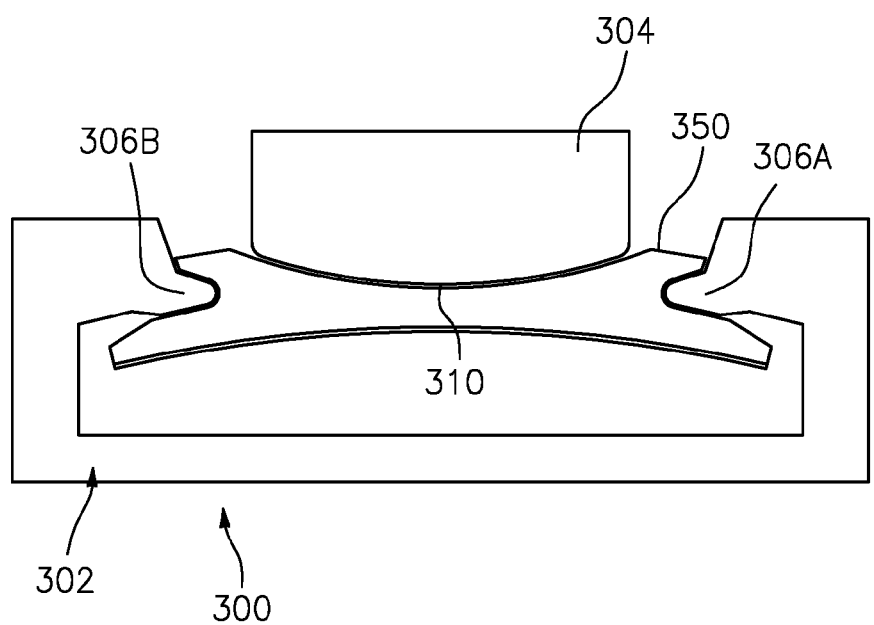
FIG. 9 is view of a test fixture with a BOAS segment.

FIG. 9 shows a static load test system 300 comprising a test fixture 302 and a ram 304. The ram simulates pressure loading such as shown by arrows in FIG. 3A. The fixture 302 has a generally upwardly open channel-like section wherein the walls of the channel end in features 306A, 306B for simulating the portions of the two retention blocks that would interface with a given steel segment. The ram 304 has an underside 310 complementary to the outer diameter (OD) well 100 of the BOAS segment to simulate pressure loads.

FIG. 9 shows a fracture path 350 extending through the mounting ear. In tests on a baseline monolithic ceramic, this has been observed as intersecting the well 100 at an angle substantially off-normal to the surface of the well. The off-normality indicates that the plies are not oriented to best resist the stresses. An exemplary re-engineering involves adding the wedges 162, 164 to shift the plies of the group 98 (FIG. 5) to an orientation more normal to the observed fracture 350. In the exemplary embodiment, this involves deepening the wall surface (making more radial rather than more circumferential). Also, as noted above, the member 170 may distribute loads from the retention block to further limit crack initiation at the recess 96A, 96B.

With reference back to FIG. 4, the base structure 84 is held together in one example by an overwrap layer 86. In this example, the overwrap layer 86 is provided by either a single CMC sheet or a plurality of layered CMC sheets defining a single overwrap layer 86. In another example, the overwrap layer 86 may be provided using a PIP, CVI or CVD process.

With continued reference to FIG. 4, and with additional reference to FIG. 8 (which illustrates the overwrap layer 86 in a laid-out state), the overwrap layer 86 includes a central body portion 214 (FIG. 8) having a plurality of flaps and projections extending therefrom. When formed, the central body portion 214 forms a radially innermost layer of the BOAS segment. The overwrap layer may be initially formed oversized in some locations and then machined down after a consolidation step to then form the final shape of the BOAS segment.

For example, the central body portion 214 includes a first pair of projections 216A, 218A which provide overwrap at the first end portion 95A. The overwrap layer similarly includes a pair of projections 216B, 218B which provide overwrap at the second end portion 95B. In one example, the overwrap layer 86 is bent about a first pair of bends $B_1$ to position the projections 216A, 216B, 218A, 218B relative to end portions of the base structure 84.

The overwrap layer further includes a fore flap 224 and an aft flap 226 extending from the central body portion 214. When the overwrap layer is bent about a pair of second bends $B_2$, the fore and aft flaps 224, 226 provide fore and aft surfaces of the BOAS segment 74, respectively. The overwrap layer 86 may include a plurality of primary fibers extending in a direction substantially parallel to the first and second pairs of bends $B_1$, $B_2$ to increase the ease of folding the overwrap layer 86.

Projections 228A, 230A extend from the fore and aft flaps 224, 226, respectively, to fall along a first end of the well 100. The fore and aft flaps also include another pair of projections 228B, 230B which fall along a second end of the well 100. A third, relatively larger pair of projections 236, 238 are provided between the projections 228A, 228B and 230A, 230B and wrap back down to form fore and aft surfaces of the well 100.

The projections of the overwrap layer 86 urge the base structure 84 against the central body portion 214 of the overwrap layer 86. In the example where the base structure 84 is made of layered CMC sheets, the overwrap layer 86 provides an effective cap over the edges of the sheets to prevent delamination. Accordingly, the overwrap layer 86 securely holds the base structure 84 intact, against the central body portion 214. By virtue of the discussed arrangement, the overall BOAS segment 74 is relatively strong, lightweight, and temperature resistant.

Manufacture and use may otherwise correspond to the methods of the '764 publication.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:
1. A blade outer air seal (BOAS) segment comprising:
a transversely concave inner diameter (ID) surface along a main body portion and extending from a first circumferential end to a second circumferential end;
a first mounting ear extending outward from the main body portion, the first mounting ear and a first end portion of the main body portion defining a first circumferentially outwardly open mounting recess;
a second mounting ear extending outward from the main body portion, the second mounting ear and a second end portion of the main body portion defining a second circumferentially outwardly open mounting recess;
an outwardly open well between the first mounting ear and the second mounting ear;

a plurality of layers formed of a ceramic matrix composite (CMC) material, the plurality of layers including:
- a first plurality of layers extending along the first circumferentially outwardly open mounting recess;
- a second plurality of layers extending along the second circumferentially outwardly open mounting recess; and
- a third plurality of layers extending along from the first mounting ear to the second mounting ear;

one or more first wedges between layers of said plurality of layers along the first mounting ear to circumferentially flare the layers along the first mounting ear; and one or more second wedges between layers of said plurality of layers along the second mounting ear to circumferentially flare the layers along the second mounting ear.

2. The blade outer air seal (BOAS) segment as recited in claim 1, wherein the plurality of layers further include:
- one or more fourth layers between the first plurality of layers and the inner diameter (ID) surface; and
- one or more fifth layers between the second plurality of layers and the inner diameter (ID) surface.

3. The blade outer air seal (BOAS) segment as recited in claim 2, wherein the plurality of layers further include:
- one or more sixth layers between:
  - the one or more fourth layers, the third plurality of layers, and the one or more fifth layers; and
  - the inner diameter (ID) surface.

4. The blade outer air seal (BOAS) segment as recited in claim 1, wherein:
- a base structure comprises the first, second, and third pluralities of layers; and
- the plurality of layers further comprises an overwrap layer over the base structure.

5. The blade outer air seal (BOAS) segment as recited in claim 4, wherein the overwrap layer overwraps forward and aft ends of the base structure.

6. The blade outer air seal (BOAS) segment as recited in claim 1, wherein the first and second pluralities of layers are curved in substantially a C-shape to respectively provide the first and second mounting recesses.

7. The blade outer air seal (BOAS) segment as recited in claim 1, wherein:
- the one or more first wedges and the one or more second wedges comprise CMC or monolithic ceramic.

8. The blade outer air seal (BOAS) segment as recited in claim 1, wherein:
the one or more first wedges and the one or more second wedges have a peak thickness of at least 0.15 mm.

9. The blade outer air seal (BOAS) segment as recited in claim 1, wherein:
the one or more first wedges and the one or more second wedges respectively fan each of the first mounting ear and the second mounting ear by at least 15.0°.

10. The blade outer air seal (BOAS) segment as recited in claim 1, further comprising:
- a first load-distributing member along the first mounting recess; and
- a second load-distributing member along the second mounting recess.

11. The blade outer air seal (BOAS) segment as recited in claim 10, wherein:
the first load-distributing member and the second load-distributing member are coatings.

12. The blade outer air seal (BOAS) segment as recited in claim 11, wherein:
the first load-distributing member and the second load-distributing member are silicon-based.

13. The blade outer air seal (BOAS) segment as recited in claim 10, wherein:
the first load-distributing member and the second load-distributing member have peak thickness of at least 0.05 mm.

14. A gas turbine engine comprising:
- an engine case:
- a circumferential array of blade outer air seal (BOAS) segments as recited in claim 1; and
- a plurality of retention blocks attached to the engine case and each comprising a first portion received in the first recess of a first adjacent said BOAS segment and a second portion received in the second recess of a second adjacent said BOAS segment to support the BOAS segments relative to the engine case.

15. The gas turbine engine as recited in claim 14, wherein the retention block first portion and the retention block second portion respectively contact coatings on the respective associated BOAS segments.

16. The gas turbine engine as recited in claim 14, wherein a plurality of wedge seals are respectively between the plurality of retention blocks and their associated BOAS segments.

* * * * *